United States Patent
Hijazi et al.

(10) Patent No.: US 7,844,844 B2
(45) Date of Patent: Nov. 30, 2010

(54) SYSTEM AND METHOD FOR RESERVING INFORMATION HANDLING SYSTEM BATTERY CHARGE TO PERFORM DIAGNOSTICS

(75) Inventors: Mohammed K. Hijazi, Austin, TX (US); Matthew Torgerson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 540 days.

(21) Appl. No.: 11/780,529

(22) Filed: Jul. 20, 2007

(65) Prior Publication Data

US 2009/0024858 A1    Jan. 22, 2009

(51) Int. Cl.
*G06F 1/00*  (2006.01)
*H02J 7/00*  (2006.01)
*G01N 27/416* (2006.01)
*G01R 31/36* (2006.01)

(52) U.S. Cl. .................. 713/323; 713/340; 320/107; 320/137; 324/426; 702/63

(58) Field of Classification Search ............. 713/323, 713/340; 320/107, 137; 324/426; 702/63
See application file for complete search history.

(56) References Cited

U.S. PATENT DOCUMENTS

| 5,187,425 | A  |   | 2/1993 | Tanikawa ................. 320/31 |
| 5,218,607 | A  | * | 6/1993 | Saito et al. ................. 714/22 |
| 5,442,794 | A  | * | 8/1995 | Wisor et al. ............... 713/340 |
| 6,288,522 | B1 |   | 9/2001 | Odaohhara et al. ....... 320/138 |
| 7,020,543 | B1 | * | 3/2006 | Jaeschke et al. .......... 700/275 |
| 7,490,266 | B2 | * | 2/2009 | May ........................ 714/22 |
| 7,541,776 | B2 | * | 6/2009 | Tupman et al. .......... 320/134 |

* cited by examiner

*Primary Examiner*—Stefan Stoynov
(74) *Attorney, Agent, or Firm*—Hamilton & Terrile, LLP; Robert W. Holland

(57) ABSTRACT

A power diagnostics module running on an information handling system initiates a power down state of the information handling system upon detection of a predetermined battery charge that is sufficient to allow the information handling system to recover from the power down state and run the power diagnostics module. The power diagnostics module runs on the predetermined charge to diagnose faults associated with the power system, such as failure of an external AC adapter, and to present the faults to an end user, such as at a display, with LEDs or through a network message.

20 Claims, 3 Drawing Sheets

SYSTEM AND METHOD FOR RESERVING INFORMATION HANDLING SYSTEM BATTERY CHARGE TO PERFORM DIAGNOSTICS

BACKGROUND OF THE INVENTION

1. Field of the Invention

The present invention relates in general to the field of information handling system diagnostics, and more particularly to a system and method for reserving information handling system battery charge to perform diagnostics.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling system components have grown increasingly capable, consumers have trended towards selecting systems having reduced size and increased portability. One example of this trend is the increased selection of portable information handling systems by consumers for both home and business use. Portable information handling systems are self-contained systems that include all components needed for operation in a portable chassis. For example, portable information handling systems typically integrate an LCD panel in a rotationally-coupled lid to present information visually to an end user. As another example, portable information handling systems typically include wireless networking capability so that an end user can communicate through networks without being tied to a hardwired network connection, such as Ethernet. As another example, portable information handling systems typically include an internal battery as a portable power source for powering the system without being tied to a hardwired power source, such as an electrical socket. These internal batteries are generally rechargeable, such as lithium-based batteries, and replaceable, such as by sliding the battery into and out of a bay formed in the portable information handling system chassis. The portable information handling system typically has an external power adapter that plugs into a wall socket and converts AC power into DC power that is provided to the portable information handling system power subsystem for both running the information handling system and recharging the internal battery.

Although internal battery power provides end users with greater flexibility in the use of portable information handling systems, it also adds some complexity to the maintenance of the information handling system. For example, to conserve battery power, portable information handling systems typically use a variety of power states, such as those defined by ACPI, that are determined based on end user inputs to the system. Power subsystems typically monitor the charge present in the battery and warn end users to shut down the system or connect an external charger if the charge reaches a predetermined level, such as ten per cent of total battery power. If the battery charge becomes further depleted, portable information handling systems will typically automatically shut down to a predetermined power down state in order to prevent damage to the system and loss of end user data. For example, if the power subsystem detects that approximately three per cent of the battery's charge remains, the system typically enters a "sleep mode" in which information stored in RAM is placed into the hard disk drive or other permanent storage and the system is completely shut down. Once power becomes available again, such as by interfacing with an external power source or inserting a charged battery, the system will recover using the "sleep mode" information stored on the hard disk drive. A difficulty that arises with this arrangement is that power down to a sleep mode might result from a system failure that prevents or inhibits recovery of the information handling system, making diagnosis of the problem difficult.

SUMMARY OF THE INVENTION

Therefore a need has arisen for a system and method which aids in the diagnosis of portable information handling system failures.

In accordance with the present invention, a system and method are provided which substantially reduce the disadvantages and problems associated with previous methods and systems for diagnosis of portable information handling system failures. An information handling system transitions to a power down state with sufficient charge remaining in a battery to run a power diagnostics module. The power diagnostics module analyzes operation of the power subsystem and indicates faults so that an end user can discern whether a failure of the information handling system relates to the power system even if insufficient power remains to bring the information handling system to an operational state.

More specifically, an information has plural processing components that cooperate to process information. Power is provided to run the processing components with a power controller that provides power from an external power source or a battery. A power diagnostics module sets a battery charge state at which the information handling system transitions to a power down state so that sufficient charge remains to run the power diagnostics module after entering the power down state. The power diagnostics module initiates from the power down state to analyze the power subsystem and identify any faults that prevent the application of power to the information handling system, such as a faulty AC adapter. The power diagnostics module indicates any detected power subsystem faults to an end user, such as by a visual message presented at a display, a visual message presented with LEDs or a network message to a support network location.

The present invention provides a number of important technical advantages. One example of an important technical advantage is that diagnosis of a portable information handling system failure is enabled where the failure prevents power up of the information handling system. For instance, battery power for supporting operation of a diagnostic program at the information handling system allows reading of diagnostic codes to identify the failure even where insufficient power remains to bring the information handling system to a normal operating state, such as where a non-functional AC adapter has resulted in a battery charge insufficient to recover the system. Diagnostics are run with minimal power to read existing codes, test for additional failures and communicate identified failure codes to the end user, such as with LED codes, a network connection to a support location or a minimally powered display presentation. Rapid and correct identification of power subsystem failures ensures that proper corrective action will be available with minimal cost and delay.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Monitoring information handling system battery charge to enter a powered down state with sufficient power remaining to subsequently run a diagnostics module allows rapid and accurate identification of power subsystem faults, such as a failed AC adapter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
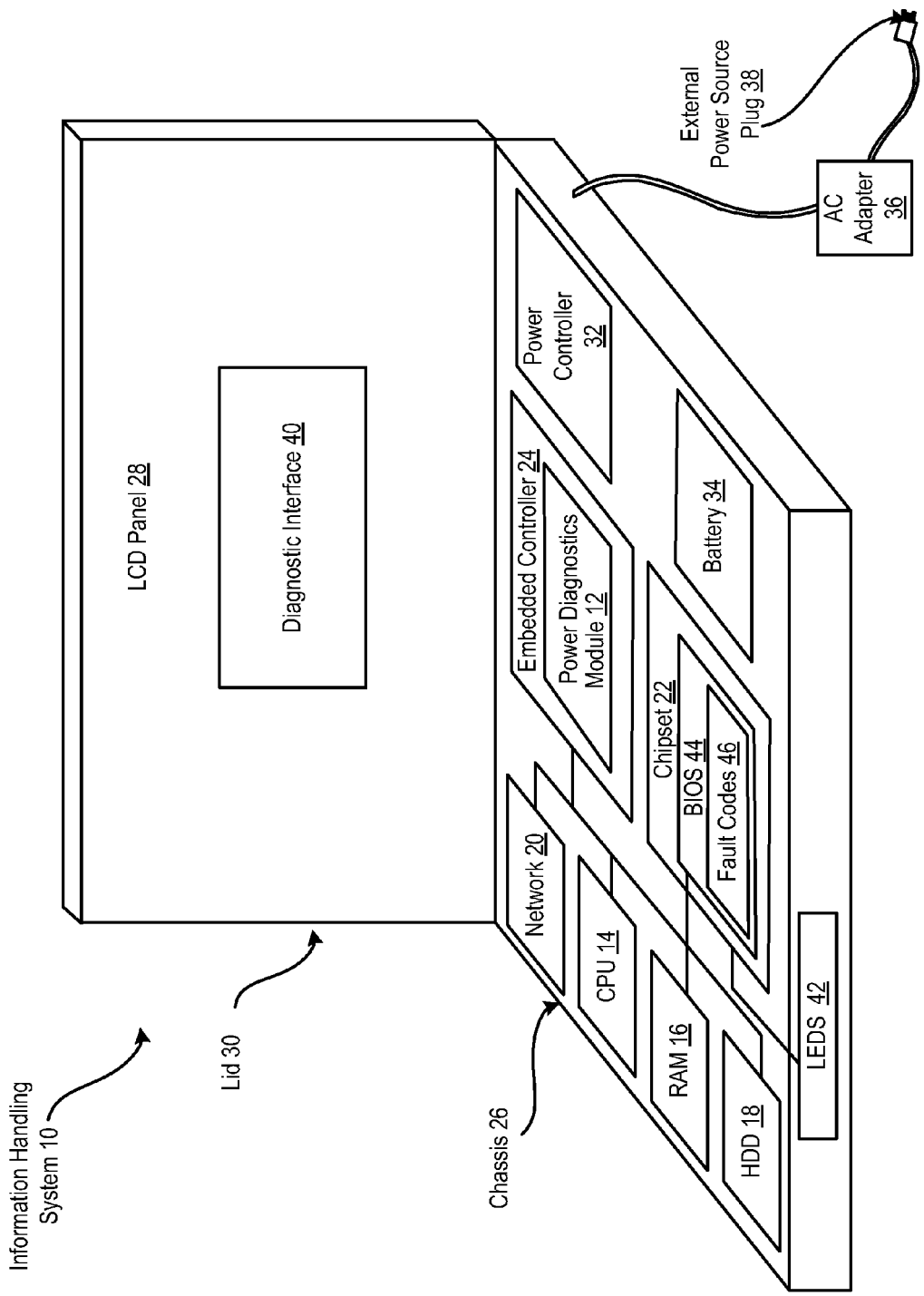
FIG. 1 depicts a block diagram of an information handling system having a power diagnostics module that initiates a power down with sufficient battery charge remaining to support subsequent execution of the power diagnostics module.

Referring now to FIG. 1, a block diagram depicts an information handling system 10 having a power diagnostics module 12 that initiates a power down with sufficient battery charge remaining to support subsequent execution of the power diagnostics module. Information handling system 10 is a portable system that processes information by cooperation of a variety of processing components, such as a CPU 14, RAM 16, a hard disk drive 18, a network card 20, a chipset 22 and an embedded controller 24, disposed in a chassis 26. Information is visually presented by an LCD panel 28 integrated in a lid 30 that is rotationally coupled to chassis 26. The processing components receive power to operate from a power controller 32, which provides the power from either a battery 34 or an external power source, such as an AC adapter 36 interfaced to external power with a plug 38. In one embodiment, power controller 32 and AC adapter 36 interface to communicate operating information, such as an identification code for the AC adapter that allows power controller 32 to ensure compatibility with the AC adapter and any fault codes generated by the AC adapter. In alternative embodiments, power controller 32 detects the presence of AC adapter 36, such as by detecting presence of a ground, and evaluates the amount of power provided by AC adapter 36. When external power is present, power controller 32 runs the processing components using the external power and applies any excess power to charge battery 34. When external power is not present, power controller 32 discharges battery 34 to provide power to the processing components.

If, while running on battery power, battery 34 discharges to a predetermined charge, a power down state, such as the ACPI sleep state, is initiated to prevent damage to the system. The power down state stores operating information on hard disk drive 18 for subsequent retrieval during a recovery from the power down state once power is again available. Power diagnostics module 12 sets the predetermined charge to a level that allows running of power diagnostics module 12 after the power down state even if external power is not available. Thus, power diagnostics module 12 initiates a power down state when the predetermined charge is detected in battery 34 and stands ready to execute from the predetermined charge if initiated by an end user. For example, failure of AC adapter 36 will result in discharge of battery 34 until the predetermined charge is reached and the power down state is initiated and entered. An attempt by the end user to restart information handling system 10 will instead initiate power diagnostics module 12 using the predetermined charge remaining in battery 34. Power diagnostics module 12 inquires with power controller 32 to determine whether a fault exists at AC adapter 36. If a fault exists at AC adapter 36, power diagnostics module 12 indicates the fault to the end user, such as through a diagnostics interface 40 presented at LCD panel 28, through visual indications provides by LEDs 42 or through a message sent through network card 20 to a network location, such as a support site available through the Internet. If no fault is detected but external power is absent, power diagnostics module 12 suggests the application of external power. If no fault is detected and external power is detected, power diagnostics module 12 initiates recovery of information handling system 10 from the power down state. In one embodiment, upon initiation of the power down state, all faults detected at information handling system 10 are stored in permanent memory, such as the hard disk drive or flash memory associated with a BIOS 44. Power diagnostics module 12 retrieves the fault codes 46 for presentation along with the results of the power subsystem diagnosis.

Figure 2:
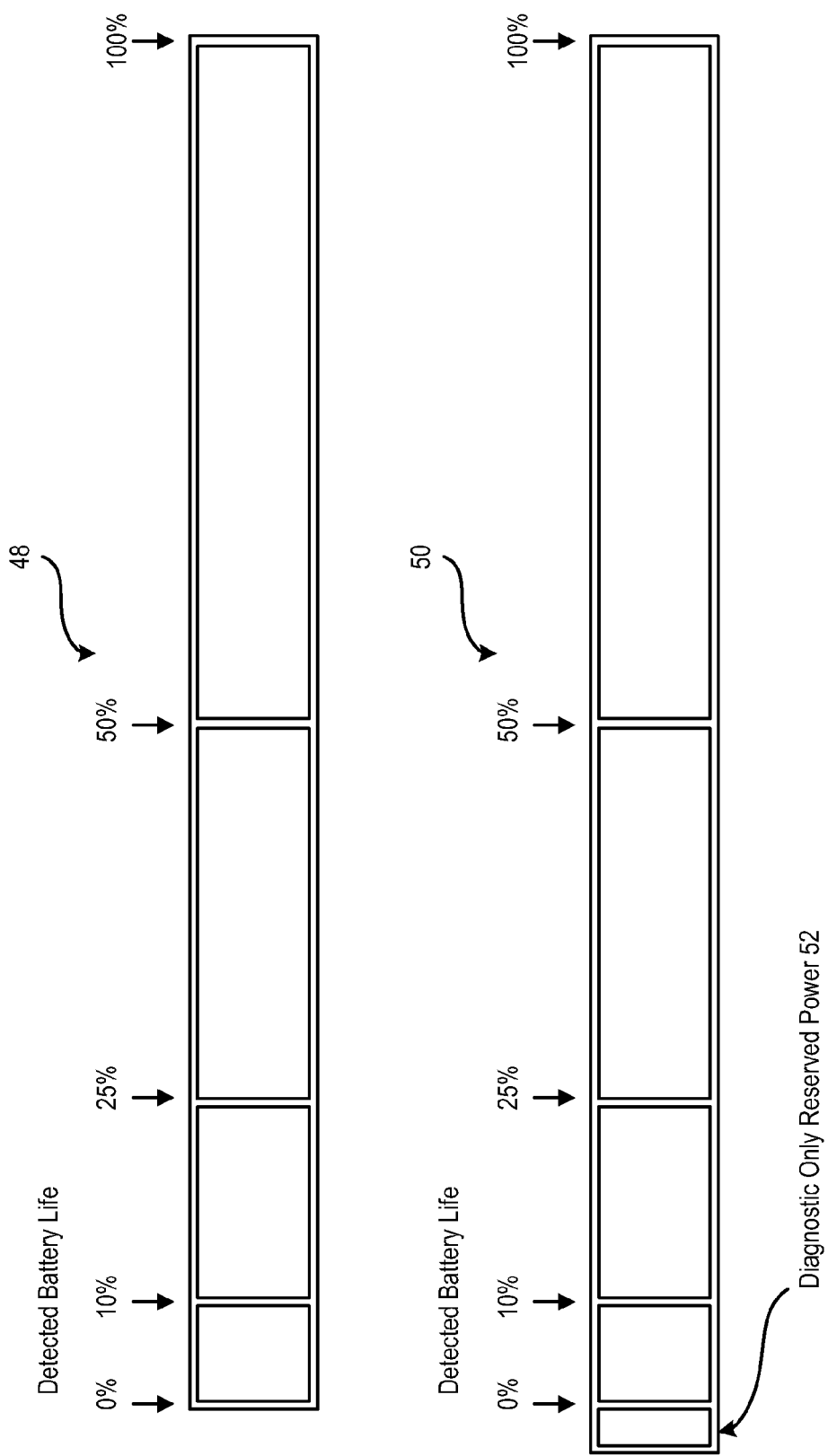
FIG. 2 depicts a bar graph of detected battery charge and battery charge reported to an operating system so that sufficient charge remains after a power down state to run the power diagnostics module.

Referring now to FIG. 2, a bar graph depicts detected battery charge 48 and battery charge reported to an operating system 50 so that sufficient charge remains after a power down state to run the power diagnostics module. In order to initiate a power down state at a predetermined charge that is sufficient to run power diagnostics module 12, power diagnostics module 12 alters the battery charge that is reported to an operating system of information handling system 10. The operating system enforces user preferences selected for power warnings and initiation of a power down state based on the per cent of remaining battery life, however, as depicted by bar 50, when the operating system has zero battery life remaining reported to it, a diagnostics-only reserved power 52 remains to run power diagnostics module 12. The diagnostics-only reserved power may be insufficient to completely power-up information handling system 10, however, power needed for diagnostics is kept to a minimal amount so that the impact battery life is minimal. For example, power diagnostics module 12 is run as firmware operating on embedded controller 24 or similar components that uses minimal power, such as chipset 22 or power controller 32. As another example, output of diagnosis results is minimized by using BIOS 44 to drive LCD panel 28 or by illuminating LEDs 42.

Figure 3:
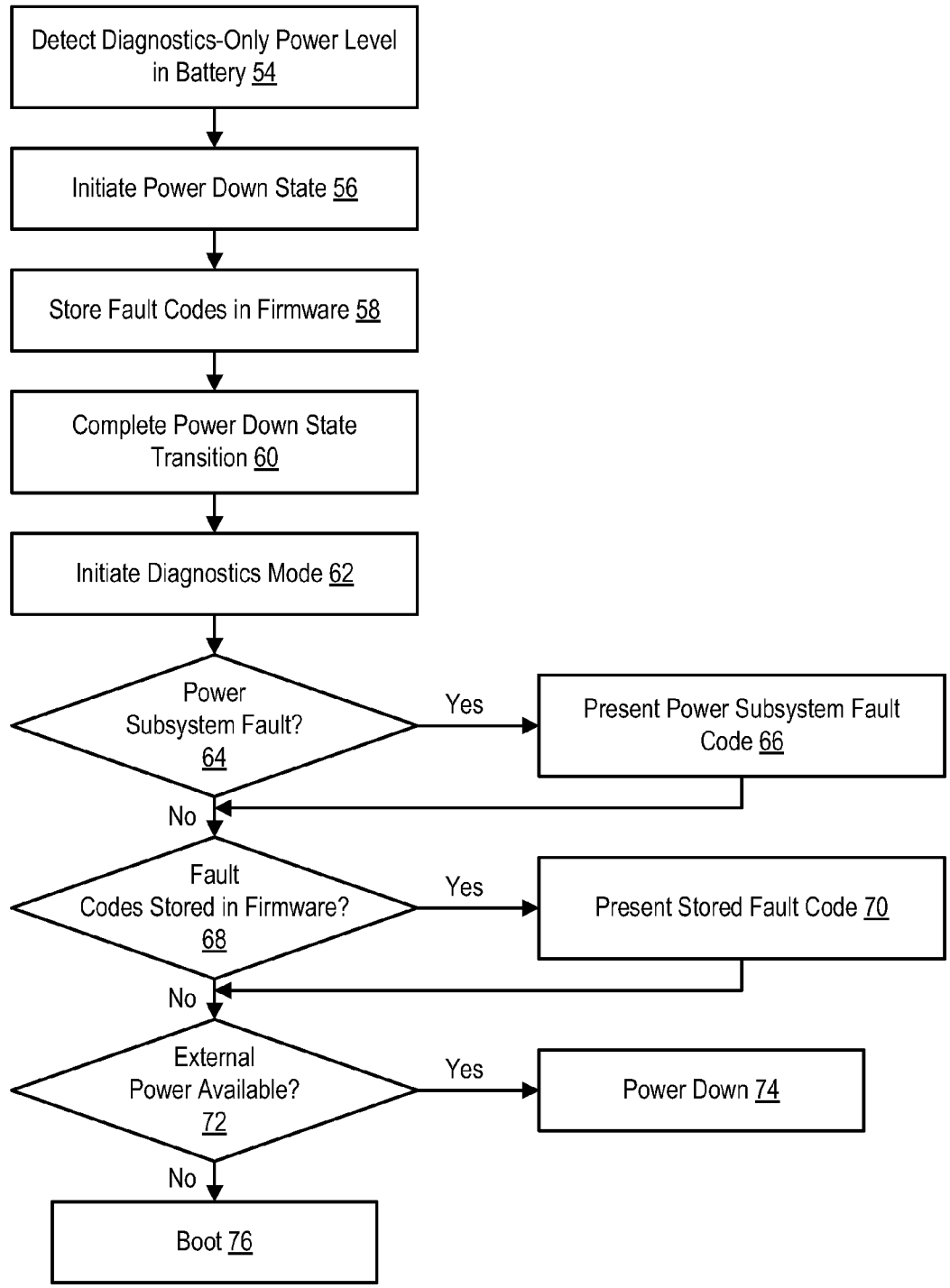
FIG. 3 depicts a flow diagram of a process for managing battery charge to allow execution of a power diagnostics module after entry into a powered down state.

Referring now to FIG. 3, a flow diagram depicts a process for managing battery charge to allow execution of a power diagnostics module after entry into a powered down state. The process begins at step 54 with detection of diagnostics-only power charge level in an information handling system. At step 56, initiation of a power down state is begun and, at step 58, existing fault codes are stored in firmware or other permanent storage of the information handling system. At step 60, the transition to the power down state is completed. At step 62, a diagnostics mode is initiated, such as by an attempt to start the information handling system or otherwise recover to an operational state. At step 64, diagnostics are run to determine if a power subsystem fault exists. If a power subsystem fault exists, the process continues to step 66 to present the power system fault code to the end user. In the example above where the power down state resulted from a failed external power adapter, the end user is provided with helpful information to correct the problem even though the information handling system has limited functionality. If no power subsystem faults are detected, the process continues to step 68 to retrieve any stored fault codes. If fault codes are stored, the process continues to step 70 to present the fault codes. If no stored fault codes are found, the process continues to step 72 to determine if external power is available. If external power is not available, the system power down at step 74. If external power is available, the process continues to step 76 to boot the information handling system to an operational state.

Although the present invention has been described in detail, it should be understood that various changes, substitutions and alterations can be made hereto without departing from the spirit and scope of the invention as defined by the appended claims.

What is claimed is:

1. An information handling system comprising:
a chassis;
processing components disposed in the chassis and operable to process information;
a display integrated with the chassis and operable to present information;
a battery integrated with the chassis and operable to provide power to the processing components and the display;
a power controller integrated with the chassis, the power controller interfaced with the battery and an external power source, the power controller operable to provide power to the processing components and to charge the battery with power from the external power source; and
a power diagnostics module operable to run on a processing component, the power diagnostics module interfaced with the battery and the power controller, the power diagnostics module further operable to monitor the battery charge to initiate a power down state if a predetermined minimum charge is detected, the predetermined minimum charge sufficient to restart one or more of the processing components from the power down state and run the power diagnostics module on the restarted processing component.

2. The information handling system of claim 1 wherein the power diagnostics module is further operable to initiate from the power down state by running with the predetermined minimum charge, to diagnose the power controller, and to provide an indication of the diagnosing of the power controller.

3. The information handling system of claim 2 wherein the indication of the diagnosing of the power controller comprises presentation of visual information at the display.

4. The information handling system of claim 2 wherein the indication of the diagnosing of the power controller comprises presentation of visual information at one or more LEDs integrated in the chassis.

5. The information handling system of claim 2 wherein the indication of the diagnosing of the power controller comprises a network message.

6. The information handling system of claim 2 wherein the power diagnostics module is further operable to store fault codes present at the processing components in permanent storage before initiation of the power down mode and to present the fault codes with the indication of the diagnosing of the power controller.

7. The information handling system of claim 2 wherein the diagnosing of the power controller comprises a determination that external power is available, the power diagnostics module further operable to initiate a recovery from the power down state by using the external power.

8. The information handling system of claim 2 wherein the diagnosing of the power controller comprises diagnosis of an external power adapter and the indication of the diagnosing comprises an indication of failure of an external power adapter.

9. A method for monitoring information handling system battery charge, the method comprising:
detecting a predetermined battery charge associated with a minimum charge needed to power down the information handling system, restart at least a portion of the information handling system and then run a diagnostics application on the information handling system; and
entering a power down state of the information handling system in response to detecting the predetermined battery charge.

10. The method of claim 9 further comprising:
detecting a request to run the diagnostics application;
running the diagnostics application on the information handling system with the predetermined charge; and
providing a diagnosis indication with the predetermined charge.

11. The method of claim 10 wherein detecting a request to run the diagnostics application further comprises detecting a request to recover from the power down state.

12. The method of claim 10 wherein providing a diagnosis indication comprises presenting diagnosis information at a display integrated with the information handling system.

13. The method of claim 10 wherein providing a diagnosis indication comprises presenting diagnosis information at one or more LEDs integrated with the information handling system.

14. The method of claim 10 wherein providing a diagnosis indication comprises communicating a message through a network.

15. The method of claim 10 further comprising:
storing one or more fault codes in permanent memory before entering the power down state;

retrieving the fault codes with the diagnostics module; and presenting the fault codes with the diagnosis indication.

16. The method of claim 10 further comprising:

detecting the presence of external power at the information handling system; and recovering from the power down state in response to the detecting of external power.

17. A system for monitoring information handling system battery charge, the system comprising:

a power controller operable to receive power from an external adapter to power information handling system components and to provide power to charge an internal battery of the information handling system; and a power diagnostics module interfaced with the power controller, the power diagnostics module operable to initiate a power down state of the information handling system at detection of a predetermined charge in the battery, the predetermined charge sufficient to power down the information handling system, power up at lease a portion of the information handling system, run the power diagnostics module, and report the results of a diagnosis by the power diagnostics system.

18. The system of claim 17 wherein the power diagnostics module is further operable to run on the information handling system with the predetermined charge to diagnose faults associated with the external adapter and to provide diagnosed faults at the information handling system.

19. The system of claim 18 wherein the diagnostics module is further operable to store faults detected at the information handling system before entry into the power down state and to provide the stored faults with diagnosed faults.

20. The system of claim 17 wherein the power diagnostics module initiates a power down state at the predetermined charge by adjusting a battery charge reported to an operating system.

* * * * *